United States Patent [19]

Judd

[11] 4,354,143
[45] Oct. 12, 1982

[54] EQUIPMENT TO CORRECT ABERRATIONS OF A CATHODE RAY BEAM

[75] Inventor: Ian D. Judd, Eastleigh, England

[73] Assignee: International Business Machines Corporation, Armonk, N.Y.

[21] Appl. No.: 214,146

[22] Filed: Dec. 8, 1980

[30] Foreign Application Priority Data

Dec. 15, 1979 [GB] United Kingdom ............... 7943294

[51] Int. Cl.$^3$ .................. H01J 29/70; H01J 29/76
[52] U.S. Cl. .................................. 315/368; 315/367
[58] Field of Search ................ 315/13 C, 368, 371, 315/382, 367

[56] References Cited

U.S. PATENT DOCUMENTS 4,203,051 5/1980 Hallett et al. ................. 315/368
4,203,054 5/1980 Sowter ........................ 315/13 C

FOREIGN PATENT DOCUMENTS 1510700 5/1978 United Kingdom .

*Primary Examiner*—Theodore M. Blum
*Attorney, Agent, or Firm*—Frederick D. Poag

[57] ABSTRACT

Aberrations of an electron beam are corrected as the beam is scanned across the screen of a cathode ray tube by deriving correction signals from stored digital values by means of the calculus of finite differences. The digital values, which are the initial differences of polynomial correction functions, are held in store 10 and summed in adder 20, the results being converted by digital-to-analog converter 50 to analog signals and supplied to the cathode ray tube. Provision is made for the reduction of error in the calculations by shifting higher order differences relative to lower order differences before addition. The circuitry may be implemented on a single chip. Preferably, the invention is applied to the correction of misconvergence in a shadow mask tube.

5 Claims, 4 Drawing Figures

EQUIPMENT TO CORRECT ABERRATIONS OF A CATHODE RAY BEAM

FIELD OF THE INVENTION

This invention relates to cathode ray tube equipment including correction means for correcting abberations of the cathode ray beam as the beam is scanned across the screen. Preferably, the invention is applied to the correction of misconvergence in a shadow mask color tube, but it is also applicable to pin-cushion correction and dynamic focussing.

BACKGROUND OF THE INVENTION

Such abberations have in the past been corrected by manual adjustment of the cathode ray tube analog drive circuitry. British Pat. No. 1,517,119 proposed that aberrations be corrected dynamically by reading correction signals from a digital store as the beam is being scanned across the screen. The correction signals are, however, directly representative of the corrections to be applied and this implementation is unduly expensive of storage space. Copending application Ser. No. 214,145 filed Dec. 8, 1980 proposes that the correction signals be derived from stored parameters and describes and claims analog circuitry to achieve this end. Although this latter approach is a highly effective means for achieving correction, the reducing cost of digital circuitry makes the digital rather than the analog approach an interesting alternative, especially if the digital circuitry can be kept simple enough to occupy a single chip.

SUMMARY OF THE INVENTION

It has been found that the key to achieving this simplicity is the calculus of finite differences in which the only operations required are those of signed additions and shift.

According to the invention, cathode ray tube equipment including correction means for correcting aberrations of a cathode ray beam as the beam is scanned across the screen, said correction means being responsive to correction signals, is characterized by a digital store arranged in operation to store finite differences of functions defining the correction signals and digital calculating apparatus which in operation derives the correction signals by summing appropriate finite differences.

Preferably the cathode ray tube is a shadow mask color tube and the aberration being corrected is misconvergence.

BRIEF DESCRIPTION OF THE DRAWINGS

The invention will further be explained by way of example with reference to the drawings, in which.

DETAILED DESCRIPTION

Figure 1:
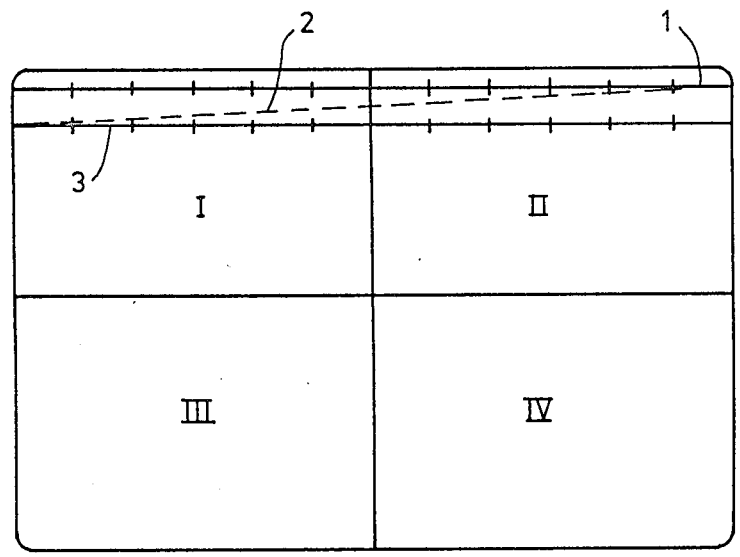
FIG. 1 is a diagram representing the screen of a cathode ray tube.

The principles underlying the invention will first be explained, with reference to FIG. 1. As is well known, the fact that the screen of a cathode ray tube is not spherical with center at the virtual source of an electron beam causes distortion of the image generated by the beam. The distortion, or non-linearity, of the image is a function of the beam position at the tube screen, so that the correction to be applied to the beam control circuitry is also a function of the notional beam position at the screen: $F=F(x,y)$. In this discussion, x is the notional beam position measured parallel to the lines of a raster scan; y is orthogonal to x. The non-linearity to be corrected may be beam focus or it may be pin-cushion distortion in a single gun tube. Of most interest is the correction of misconvergence in a multigun shadow mask cathode ray tube. If the tube is of the well-known delta gun type with three electron guns arranged at the apices of the triangle, there are four correction signals to be generated. These are the red, green, blue radial and blue lateral corrections. Each is a function of both x and y and can be expressed as a polynomial. The invention proposes that as a raster image is being refreshed, the correction function be digitally calculated from a small number of stored constants. The raster consists of a sequence of parallel sequential horizontal sweeps 1 of the electron beams across the screen. An image is displayed by selectively brightening the beams as they travel from left to right across the screen, the beams being blanked as they move from the right hand side of the screen to the beginning of the next line, i.e., during line flyback 2, and as they travel from the end of the bottom line to the beginning of the top line, i.e., during frame flyback (not shown). As the beams traverse one raster line 1, y has a constant value and the correction signal calculation reduces to the evaluation of a polynomial in x only. In practice, the correction signals can be treated as constant for small ranges of x and there is no need to evaluate the function continuously. Each line of the raster is divided into equal zones 3 and the correction is calculated for each zone. Although application of the invention is not restricted to any specific range of orders of the polynomial function, satisfactory results have been obtained with $F(x,y)$ as a cubic polynomial in x and y. By way of example, the evaluation of cubic polynomials will be described. It will be understood that there is an upper limit to the amount of computation that can be done as the CRT beam is moving across the screen. It has been found however that computations involving quartics can satisfactorily be executed by the procedures described without delaying the tracing of the raster scan.

In a practical embodiment, the CRT screen is divided into four quadrants I to IV with different polynomials in each quadrant. In each quadrant there are 32 horizontal zones and 256 lines. In each zone a value of the polynomial corresponding to the coordinates of the zone is computed. The origin of the coordinate system is taken to be the top left-hand corner of each quadrant with x increasing from left to right and y increasing from top to bottom. Any cubic function of x and y can be written in the form $$F(x,y)=Ax^3+Bx^2+Cx+D$$

where A, B, C and D are each cubic functions of y. For each line of the raster y is constant. The computation of such functions over the four quadrants of a CRT screen, there being a different function for each quadrant, involves the following procedure:

1. Store the initial differences corresponding to the value of y for the top line of each quadrant.
2. As the CRT beam traverses the top line of the screen evaluate F for each zone 3, changing the function being evaluated as the beam moves into the top right quadrant, II.
3. During line flyback compute the initial differences for the new value of y, i.e. the value of y at the next raster line, for the top left and right quadrants I, II, respectively.
4. Repeat for each line of the top half of the screen until the line flyback before the top raster line of the bottom quadrants, III, IV, when the initial differences corresponding for the functions for the bottom quadrants, III, IV, are retrieved.
5. Repeat for the bottom quadrants.

The polynomial function of x and y is evaluated using finite differences. Consider the function:

$$F(x) = Ax^3 + Bx^2 + Cx + D$$

Evaluate it at x=0, 1, 2, 3, 4, and take the differences:

| x | = | 0 | 1 | 2 | 3 | 4 |
|---|---|---|---|---|---|---|
| F (x) | = | D | A+B+C+D | 8A+4B+2C+D | 27A+9B+3C+D | 64A+16B+4C+D |
| $d_1$ | = | A+B+C | 7A+3B+C | 19A+5B+C | 37A+7B+C | |
| $d_2$ | = | 6A+2B | 12A+2B | 18A+2B | | |
| $d_3$ | = | 6A | 6A | | | |

It can be seen that the third differences $d_3$ all have the value 6A. In general a polynomial of degree N has constant value Nth order differences with all higher order differences zero. Given F(O), $d_{11}$, $d_{21}$ and $d_3$, the values of $F(x_i)$ (i=1, 2, 3, 4, ...), with the intervals ($x_n$, $x_{n+1}$) equal, can be found by addition.

Figure 2:
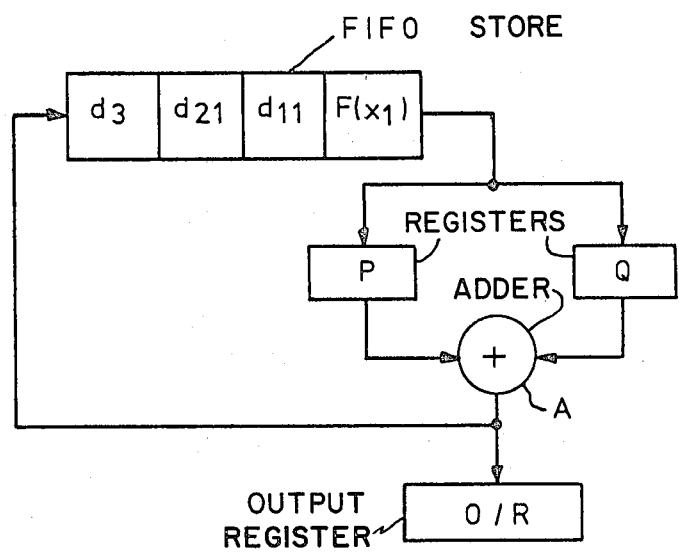
FIG. 2 is a schematic diagram of digital apparatus suitable for deriving functions from their finite differences.

Apparatus for calculating the function $F(x_i)$ is schematically illustrated at FIG. 2 which shows a first-in first-out store FIFO, two registers P and Q, an adder A and an output register O/R. A first-in first-out store is a store from which data is retrieved only in the order in which it was entered in the store. The output of FIFO is connected to registers P and Q which are connected to adder A. The output of adder A is connected as input to FIFO and to the output register O/R. Initially FIFO stores, $F(x_1)$, $d_{11}$, $d_{21}$ and $d_3$ in that order, with $F(x_1)$ occupying the location nearest the output. The following table specifies the procedure whereby $F(x_2)$, $d_{12}$ and $d_{22}$ are calculated.

TABLE 1

| Operation | Content of: | P | Q | FIFO |
|---|---|---|---|---|
| 1. Read FIFO to P | | $F(x_1)$ | | |
| 2. Read FIFO to Q | | | $d_{11}$ | |
| 3. Sum P,Q to FIFO and O/R | | | | $F(x_1)+d_{11}=F(x_2)$ |
| 4. Read FIFO to P | | $d_{21}$ | | |
| 5. Sum P,Q to FIFO | | | | $d_{11}+d_{21}=d_{12}$ |
| 6. Read FIFO to Q | | | $d_3$ | |
| 7. Sum P,Q to FIFO | | | | $d_{21}=d_3=d_{22}$ |
| 8. Clear P | | 0 | | |
| 9. Sum P,Q to FIFO | | | | $d_3$ |

The operation specified by the third line of the table makes the function F available at the output register O/R. The remaining operations obtain the differences and load them into FIFO in the correct order.

Figure 3:
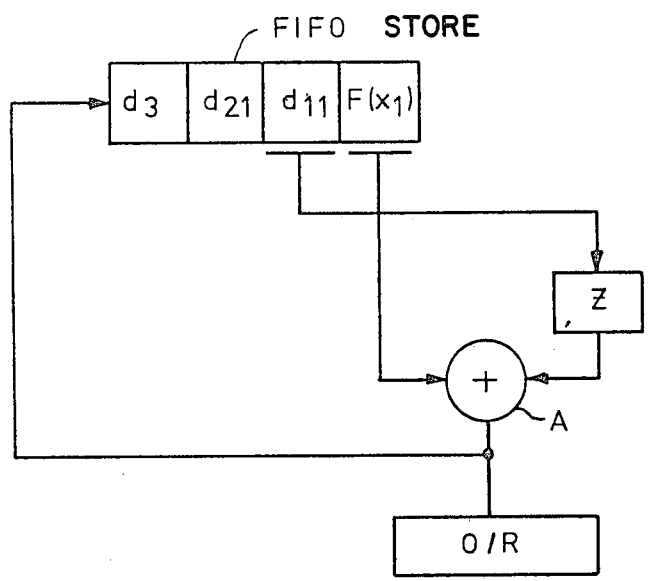
FIG. 3 is a schematic diagram of an alternative to that of FIG. 2.

An alternative arrangement is shown in FIG. 3 in which the FIFO is a four stage shift register connected so that the two rightmost stages can be read in parallel to the adder A, the second stage being connected to the adder through a zeroising circuit Z. Initially the FIFO holds the values, reading from right to left, $F(x_1)$, $d_{11}$, $d_{21}$ and $d_3$. The following table illustrates that the arrangement of FIG. 3 efficiently calculates the required finite differences:

TABLE 2

| Operation | FIFO Content |
|---|---|
| 1. Sum to O/R and FIFO | $F(x_1)$, $d_{11}$, $d_{21}$, $d_3$ |
| 2. Sum to FIFO | $d_{11}$, $d_{21}$, $d_3$, $F(x_2)$ |
| 3. Sum to FIFO | $d_{21}$, $d_3$, $F(x_2)$, $d_{12}$ |
| Activate zeroising circuit and | $d_3$, $F(x_2)$, $d_{12}$, $d_{22}$ |
| 4. sum to FIFO | $F(x_2)$, $d_{12}$, $d_{22}$, $d_3$ |

Essentially the process is the fourfold repetition of the same operation with the gates to O/R being opened on the first operation and the zeroising circuit being activated on the last operation. This can be more readily incorporated in a microcircuit module than the slightly more complex arrangement of FIG. 2 and Table 1.

Before describing a practical implementation of the idealised apparatus of FIGS. 2 and 3 it is necessary to consider the errors arising out of the use of finite differences. Errors arise due both to errors in the initial values of the differences from which all differences are derived and due to truncation errors occuring in the course of summing and differences. The following discussion is restricted to cubic functions and for convenience the function $F(x_n)$ will be called $d_{On}$. The binary word representing each diffference may be envisaged as divided into integer and fraction parts by a notional "binary point". It will be assumed, without loss of generality, that the integer part of $d_{On}$ is the required result of a finite difference summation and that it is required to confine errors to the fraction part. The stored initial values $d_{00}$, $d_{10}$, $d_{20}$ and $d_{30}$ are only approximations to the actual values d' of these differences ("actual" meaning "expressed to such degree of accuracy that errors arising in truncation-free calculation are in practice negligable"). Suppose:

| | | |
|---|---|---|
| $d'_{00}$ | = | $d_{00} + E_0$ |
| $d'_{10}$ | = | $d_{10} + E_1$ |
| $d'_{20}$ | = | $d_{20} + E_2$ |
| $d'_{30}$ | = | $d_{30} + E_3$ |

It can be shown that the error E in calculating $d_{on}$ where n is large is $$E = (\text{approx.}) \; E_0 + nE_1 + (n^2/2)E_2 + (n^3/6)E_3$$

This means that higher order differences must be stored with higher precision. But since higher order differences are smaller than the low order differences it is possible to assign more orders of their numerical representation to the fractional part of their value. Accordingly, the same number of binary integers are assigned to each order of difference but the number of places assigned to the fractional part of each difference is progressively increased for higher order differences. An equal shift of the binary point for each difference order is the easiest to implement and has been found to give satisfactory results. The length of the shift is $\log_2(n/2)$ bits, rounded to the next largest integer.

The other source of error results from the above shifting scheme and is due to truncation when differences with the binary point in different positions are added together. The preferred way of compensating for truncation errors is to add as a carry-in to the lowest order of the number with the smaller number of fractional orders the most significant truncated bit from the other number. For example

| | | | | | | | | | | |
|---|---|---|---|---|---|---|---|---|---|---|
| $d_0$ | 0 | 0 | 1 | 1 | 0 | 1 | 1 | 0 . | 1 | |
| $d_1$ | | | 1 | | 0 | 1 | 0 | 1 . | 1 | 1 0 1 |

Truncation occurs at the first binary fraction order. The 1 in the second binary fraction order is added to the sum. This reduces the maximum truncation error to the value of the highest truncated order. The truncation error can be regarded as an initialisation error in the next lower order difference. Therefore, difference m must have as many fraction places as are required to compensate for initialisation error in differences m+1. Since, as already explained, each difference needs approximately $\log_2(n/2)$ more fractional orders than the next higher order, the number of fractional places becomes:

$$d_0 = \log_2 n$$

$$d_1 = \log_2(n^2/2)$$

$$d_2 = \log_2(n^3/4)$$

$$d_3 = \log_2(n^4/8)$$

The expression for $d_3$ is a simplification since there is, in the case being considered, no $d_4$. If $n=2^q$, the number of fractional orders are:

$$d_0 = q$$

$$d_1 = 2q - 1$$

$$d_2 = 3q - 2$$

$$d_3 = 4q - 3$$

We next consider the range of values of the differences. It can be shown that the cubic function $$y = x(4x - 3)^2$$

where both x and y take any values in the interval (0,1) including the end points is the function with maximum first, second and third order differentials. Considering this function to be multiplied by $2^p$, it can be shown that, if the result is to be computed to a precision of p bits, then $d_1$ must have $p+4-q$ integer bits+sign
$d_2$ must have $p+6-2q$ integer bits+sign
$d_3$ must have $p+7-3q$ integer bits+sign Summing the integer and fractional parts and adding one bit for the sign, the total number of bits required for each difference is as follows:

$$d_0 = p + q$$

$$d_1 = p + 4 + q$$

$$d_2 = p + 5 + q$$

$$d_3 = p + 5 + q$$

The total numbers of bits of each difference which must be correctly initialised are:

$$d_0 = p + 1$$

$$d_1 = p + 5$$

$$d_2 = p + 6$$

$$d_3 = p + 6$$

Figure 4:
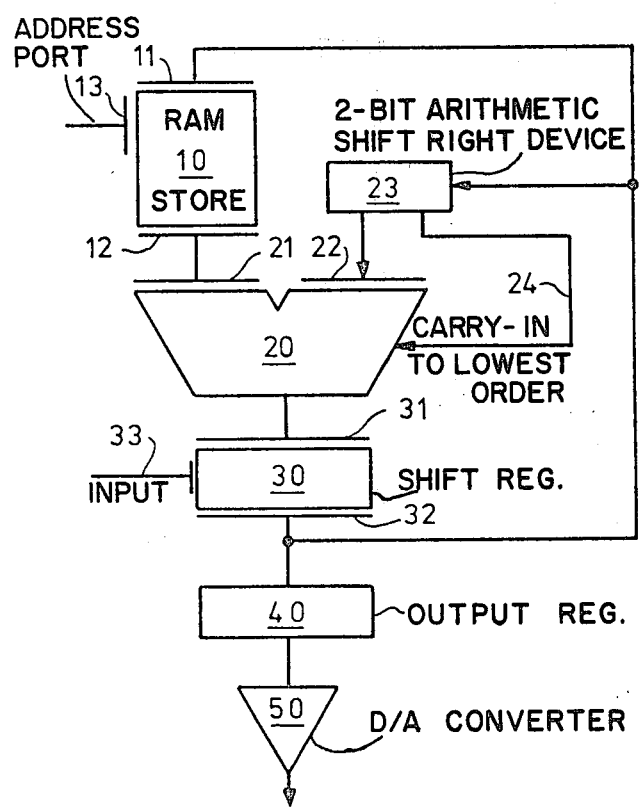
FIG. 4 is a block diagram of a practical embodiment of digital calculating apparatus suitable for use in practicing the invention.

FIG. 4 shows a practical embodiment of the invention. The embodiment includes a random access store 10, an adder 20, a shift register 30, an output register 40 and a digital-to-analogue converter 50. The store 10 replaces the function of the first-in first-out store shown in FIGS. 2 and 3 and has an input port 11, output port 12 and address port 13. The output register 12 is connected to input port 21 of the adder 20. Another input to the adder 20 is provided at port 22. The output of adder 20 is supplied to the parallel inputs 31 of shift register 30. The parallel outputs are connected to a register 40, to the input port 11 of store 10, and to a 2-bit arithmetic right shift device 23. One output of the shift device 23 is connected to port 22 and another output 24 provides a carry-in to the lowest order of the adder 20. Shift register 30 has a single-bit input 33 for the supply of data from an external source. This is the means whereby initialisation data is made available to the store 10.

The connections shown in FIG. 4 are representative, except for input 33, of a plurality of bit lines. On the basis of the theory outlined above, if it is required to provide an accurate 8-bit output for 32 horizontal zones (values of F(x,y) with y constant) in each quadrant, we have p=8, n=32=$2^q$, and so q=5. The largest number of bits in the initialised values is 14 (for $d_2$ and $d_3$). The y computation must provide an accurate 14 bit result for 256 lines. It follows that p=14 and q=8 giving a highest number of total bits as 27 (for $d_2$ and $d_3$). A data flow of 28 bits wide is an appropriate size. Port 22 is 26 bits—so that as already explained the binary points are aligned—and register 40 is 8 bits to take the result which occupies bits 10 to 17 of the output of register 30 (most significant bit is bit 0).

We now describe the information held in the store 10. The notation used for the addresses is hexadecimal, i.e. the addresses run from 00, which is binary 0000 0000, to FF, which is binary 1111 1111. By way of example, it is assumed that each frame of the image is displayed as two interlaced fields, field 1 and field 2, as is common in television practice.

TABLE 3

| Storage locations | Contents |
|---|---|
| 00 to 03 | $d_{3L}$ to $d_{0L}$ respectively-horizontal zone work store, left half of screen, quadrant I or III as appropriate, field 1. |
| 10 to 13 | $d_{3R}$ to $d_{0R}$ respectively-horizontal zone work store, right half of screen, quadrant II or IV as appropriate, field 1. |
| 20 to 23 | $d_3(d_{30L})$ to $d_0(d_{30L})$ respectively-work storage for the computation of the initial value, $d_{30L}$, field 1. |
| 24 to 27 | $d_3(d_{20L})$ to $d_0(d_{20L})$-work storage for the computation of the initial value, $d_{20L}$, field 1. |
| 28 to 2B | $d_3(d_{10L})$ to $d_0(d_{10L})$-work storage for the computation of the initial value, $d_{10L}$, field 1. |
| 2C to 2F | $d_3(d_{00L})$ to $d_0(d_{00L})$-work storage for the computation of the initial value, $d_{00L}$, field 1. |
| 30 to 3F | $d_3(d_{30R})$ to $d_0(d_{00R})$-work storage for the computation of the values of $d_{30R}$, $d_{20R}$, $d_{10R}$ and $d_{00R}$, field 1 (arranged in the same way as addresses 20-2F). |
| 40 to 5F | Initial values of the differences of which later values are computed by using work storage 20 to 3F, upper part of screen, field 1 (arranged in the same way as addresses 20-3F). |
| 60 to 7F | Initial values of the differences of which later values are computed by using work storage 20 to 3F, lower part of screen, field 1 (arranged in the same way as addresses 20-3F). |
| 80 to 83 90 to 93 A0 to AF B0 to BF C0 to DF E0 to FF | These locations contain the differences for field 2, arranged in the same fashion as the differences for field 1. |

With the differences stored as in Table 3, the operation sequences set out below as Table 4 are executed.

TABLE 4

Operation Sequences

(1) Horizontal zone (4 cycles)

| | | | | | | | | | |
|---|---|---|---|---|---|---|---|---|---|
| clear, read | F | 0 | 0 | X | 0 | 0 | 0 | 0 | |
| write | " | " | " | " | " | " | " | " | $d_3$ |
| read | F | 0 | 0 | X | 0 | 0 | 0 | 1 | |
| write | " | " | " | " | " | " | " | " | $d_2$ |
| read | F | 0 | 0 | X | 0 | 0 | 1 | 0 | |
| write | " | " | " | " | " | " | " | " | $d_1$ |
| read | F | 0 | 0 | X | 0 | 0 | 1 | 1 | |
| set output, write | " | " | " | " | " | " | " | " | $d_0$ |

(2) Left-most & middle horizontal zones (4 cycles)

| | | | | | | | | | |
|---|---|---|---|---|---|---|---|---|---|
| clear, read | F | 0 | 1 | X | 0 | 0 | 1 | 1 | $d_3$ |
| write | F | 0 | 0 | X | 0 | 0 | 0 | 0 | |
| (clear), read | F | 0 | 1 | X | 0 | 1 | 1 | 1 | $d_2$ |
| write | F | 0 | 0 | X | 0 | 0 | 0 | 1 | |
| (clear), read | F | 0 | 1 | X | 1 | 0 | 1 | 1 | $d_1$ |
| write | F | 0 | 0 | X | 0 | 0 | 1 | 0 | |
| (clear), read | F | 0 | 1 | X | 1 | 1 | 1 | 1 | $d_0$ |
| aet output, write | F | 0 | 0 | X | 0 | 0 | 1 | 1 | |

(clear) only performed on middle zone (3) Line flyback (32 cycles)

| | | | | | | | | | |
|---|---|---|---|---|---|---|---|---|---|
| clear, read | F | 0 | 1 | 0 | 0 | 0 | 0 | 0 | $d_3(d_{30L})$ |
| write | " | " | " | " | " | " | " | " | |
| read | F | 0 | 1 | 0 | 0 | 0 | 0 | 1 | $d_2(d_{30L})$ |
| write | " | " | " | " | " | " | " | " | |
| . . . | | | | | | | | | |
| . . . | | | | | | | | | |
| read | F | 0 | 1 | 1 | 1 | 1 | 1 | 0 | $d_1(d_{00R})$ |
| write | " | " | " | " | " | " | " | " | |
| read | F | 0 | 1 | 1 | 1 | 1 | 1 | 1 | $d_0(d_{00R})$ |
| write | " | " | " | " | " | " | " | " | | set output performed while writing $d_0(d_{00L})$

TABLE 4-continued

Operation Sequences clear shift register is activated while reading any $d_3$ (4) 1st or middle line flyback (32 cycles)

| | | | | | | | | | |
|---|---|---|---|---|---|---|---|---|---|
| clear, read | F | 1 | Y | 0 | 0 | 0 | 0 | 0 | $d_3(d_{30L})$ |
| write | F | 0 | 1 | 0 | 0 | 0 | 0 | 0 | |
| clear, read | F | 1 | Y | 0 | 0 | 0 | 0 | 1 | $d_2(d_{30L})$ |
| write | F | 0 | 1 | 0 | 0 | 0 | 0 | 1 | |
| . . . | | | | | | | | | |
| . . . | | | | | | | | | |
| clear, read | F | 1 | Y | 1 | 1 | 1 | 1 | 0 | $d_1(d_{00R})$ |
| write | F | 0 | 1 | 1 | 1 | 1 | 1 | 0 | |
| clear, read | F | 1 | Y | 1 | 1 | 1 | 1 | 1 | $d_0(d_{00R})$ |
| write | F | 0 | 1 | 1 | 1 | 1 | 1 | 1 | | set output performed while writing $d_0(d_{00L})$
clear shift register is activated on all read operations F = Field #,
Y = upper/lower,
X = left/right The circuitry operates cyclically, each cycle beginning with a read from the store, and after a pause to permit the result of the consequent addition to be entered in the shift register, the result is written back into the store at the same or a different location. If it is required to shift the contents of the shift register to align binary points this is done as the store is being read.

The most frequently performed operation sequence is that given in section 1 of Table 4. On the first cycle the difference $d_3$, a constant, is copied from working storage into register 30. In the second cycle the difference $d_{2n}$ is added to $d_3$ to get $d_{2(n+1)}$ which is written in working storage in preparation for the next operation sequence. The third cycle adds $d_{1n}$ to $d_{2(n+1)}$ to get $d_{1(n+1)}$ and the fourth cycle adds $d_{0n}$ to $d_{1(n+1)}$ to get $d_{0(n+1)}$. This is the required correction value and, as well as being written into working store, is provided at the output register. It will now be noted that the variables F and X cause selection of the appropriate working storage section of the random access store in accordance with whether field 1 or 2 and a left or right half of the screen is being processed, for example F=0, X=0 cause the operation sequence to access locations 00 to 03. The clear operation performed on the first cycle zeroizes the contents of register 30. Operation 1 is modified as shown in sequence 2 at the leftmost zone, the first zone at the beginning of each line of a quadrant. Although the differences $d_{01}$, $d_{11}$, $d_{21}$ and $d_3$ are calculated in the same way as during sequence 1 the initial values, $d_0$, $d_1$, $d_2$ and $d_3$, are taken from that part of the random access store in which they were written during line flyback. For example, for the top left quadrant the values are read from locations 23, 27 2B and 2F.

During a line flyback which is not before the top line of a quadrant, operation sequence 3 is used. It consists of 32 cycles, eight groups of four cycles during which the values of the initial differences are computed for the left and the right quadrants. On field 1, the first four cycles access locations 20 to 23, the next four access locations 24 to 27 and so on, until the last four cycles access locations 3C to 3F (see Table 3). Each group of four cycles computes one of the differences $d_3$ to $d_0$ for one of the quadrants, for example the differences $d_0(d_{00R})$, $d_1(d_{00R})$, $d_2(d_{00R})$ and $d_3(d_{00R})$ for the lowest order difference in the left quadrant, which is used in operation sequence 2. For the flyback before the first line of a quadrant, operating sequence 4 is used, during which the initial values of the differences are transferred from, in the case of field 1, locations 40 to 5F or 60 to 7F, depending on whether the flyback is before the top or bottom halves of the screen. Although the initial values pass through adder 20 the clearing of register 30 ensures that the other addend is zero.

There has been described digital apparatus for use in providing correction signals to control a cathode-ray tube, the correction signals being calculated from stored parameters by the use of finite differences as the cathode-ray beam is tracing a raster.

Having thus described our invention, what I claim as new, and desire to secure by Letters Patent is:

1. Cathode ray tube equipment including correction means for correcting an aberration of a cathode ray beam as the beam is scanned across the screen, said correction means being responsive to correction signals, characterized by a digital store arranged in operation to store finite differences of functions defining the correction signals and digital calculating apparatus which in operation derives cyclicy, successive correction signals by summing appropriate finite differences.

2. Equipment as claimed in claim 1, in which the cathode ray tube is a shadow mask color tube, the aberration being corrected is misconvergence, and the tube is provided with convergence correction coils, wherein a digital-to-analog conversion means converts the correction signals to correction currents which are supplied to the convergence correction coils.

3. Equipment as claimed in claim 1 or 2, wherein the digital calculating apparatus includes an adder and a register, the output of the digital store being connected to the input of the adder, the output of the adder being connected to the input of the register, the output of the register being connected to the input of the digital store and to another inut of the adder through a shift device which imposes a shift on data being transferred from the register to the said another input of the adder so as to provide reduction of error by shifting higher order differences relative to lower order differences before addition.

4. Equipment as claimed in claim 1 or claim 2 wherein the digital store is arranged in operation to store digital values which are the initial differences of polynomial correction functions, said values being altered iteratively by the digital calculating apparatus and the results being returned to said store to be read therefrom to perform succeeding calculations.

5. Equipment as claimed in claim 4 wherein the digital calculating apparatus includes an adder and a register, the output of the digital store being connected to the input of the adder, the output of the adder being connected to the input of the register, the output of the register being connected to the input of the digital store and to another input of the adder through a shift device which imposes a shift on data being transferred from the register to the said another input of the adder so as to provide reduction of error by shifting higher order differences relative to lower order differences before addition.

* * * * *